3,007,929
GERMICIDAL PIPERAZINE DERIVATIVES
Edward Joseph Nikawitz, Glen Rock, N.J., assignor to The Givaudan Corporation, New York, N.Y., a corporation of New Jersey
No Drawing. Filed Feb. 16, 1959, Ser. No. 793,290
3 Claims. (Cl. 260—268)

This invention relates to novel chemical products, and more especially to certain novel alkylamino piperazines characterized, in particular, by their germicidal activity.

My novel substances may be represented by the following formula:

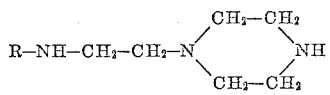

where R is $C_{12}H_{25}$ or $C_{14}H_{29}$.

It is understood that, in addition to the bases represented by the foregoing formula, salts made with inorganic acids in general or organic aliphatic acids having not more than 4 carbon atoms in the molecule or organic aromatic acids having not more than 7 carbon atoms in the molecule are also included in my present invention.

In general, the novel products of this invention are made by reacting a 1-halododecane or 1-halotetradecane with more than an equivalent amount of 1-(2-aminoethyl)-piperazine for a few hours at an elevated temperature. After converting the hydrogen halide formed by said reaction into salt with alkali and recovering the unreacted 1-(2-aminoethyl)-piperazine by distillation under reduced pressure, the desired products are obtained by distillation under a high vacuum.

For desirable practical results, it is recommended that from about 2 to about 4 mols of 1-(2-aminoethyl)-piperazine be used per mol of the halohydrocarbon.

Temperatures from about 90° C. to about 150° C. are satisfactory, although temperatures within the range from about 100° C. to about 120° C. are especially recommended.

The extent of the reaction is followed by determining the amount of ionized halogen in the reaction mixture, in accordance with known procedures.

Among the suitable alkalis which can be used to convert the hydrogen halide into salt may be noted sodium hydroxide and potassium hydroxide.

Salts with inorganic acids, suitable organic acids, and acid-reacting substances such as phenols, are prepared from free bases by the addition of appropriate equivalent amounts of acidic substances, the amount being determined by the number of basic nitrogen atoms to be neutralized.

Mixed salts can be prepared from the free bases or from "unmixed" salts, i.e., salts with at least one basic nitrogen atom. When free bases are employed, suitable equivalent amounts of two or more acids are added to the base, in the presence or absence of alcohol or water. The addition of the acids can take place simultaneously, or the acids may be added one at a time, i.e., an "unmixed" salt is first prepared as above with acid No. 1; then acid No. 2 is added thereto to form the mixed salt of acids No. 1 and No. 2, etc. It will be understood that the number of acid residues which may be contained in the mixed salts is limited by the number of amino N atoms in the compound.

The novel products of this invention possess unexpected germicidal properties. They may be used, e.g., to sterilize milk bottles and similar containers for products intended for human consumption, when dissolved in water in amounts from about 0.01% to about 0.1% by weight of the water. A disinfecting metal cleaner composition can be prepared by dissolving 1 pound of the products of this invention in 1000 to 10,000 pounds of water or a like amount of a 50% solution of water and isopropyl alcohol.

The germicidal activity of these compounds was determined by using the standard F.D.A. phenol coefficient test procedure (U.S. Dept. of Agriculture, Circular 198, Dec. 1931) with the Cade-Halvorson plate count modification (Soap, Aug. 10, 17, 1934; Sept. 25, 1934) to obtain the "counts," or number of bacteria surviving. *Micrococcus pyogenes* var. *aureus*, *Salmonella typhosa* and *Escherichia coli* were the test organisms used, the first representing the gram-positive and the latter two representing the gram-negative types of bacteria. The test temperature and contact time were 20° C. and 10 min. A minus (—) sign means "no growth" in the subculture tubes, while the numerical figures represent the number of colonies of bacteria formed by the viable organisms which were carried over to the plates from the medication tubes at the end of the test period. A difference of 50 can be considered as the limits of significant figures. Counts of more than 5,000 are estimated, as the plates showed too many colonies to be counted accurately.

Data (averages from several duplicate sets of tests) using the procedures as just described are presented in the following table.

|  | 1–20,000 in water | | | 1–40,000 in water | | | 1–50,000 in water | | |
| --- | --- | --- | --- | --- | --- | --- | --- | --- | --- |
|  | M.a. | S.t. | E.c. | M.a. | S.t. | E.c. | M.a. | S.t. | E.c. |
| 1-(N-Octyl-2-aminoethyl)piperazine | | +10,000 | | | | | | | |
| 1-(N-Decyl-2-aminoethyl)piperazine | | | | +10,000 | +10,000 | +10,000 | | | |
| 1-(N-Dodecyl-2-aminoethyl)piperazine | | | | | −0 | | +20 | −0 | +0 |
| 1-(N-Lauryl-2-aminoethyl)piperazine tech | | | | −0 | +0 | +0 | +4 | +0 | +0 |
| 1-(N-Tetradecyl-2-aminoethyl)piperazine | | | | +1 | +150 | +0 | | | |
| 1-(N-Hexadecyl-2-aminoethyl)piperazine | | | | | +10,000 | | | | |
| 4-(N-Dodecyl-2-aminoethyl)morpholine | | | | | +10,000 | | | | |

It can be seen from the foregoing data that the compounds of this invention possess unexpected germicidal properties, having in mind the absence of such properties in the analogous morpholine compound and in the closely related octyl-, decyl- and hexadecyl-aminoethyl piperazines.

In order to clarify this invention further, the following examples are given, it being intended that these examples are for purposes of illustration and not for purposes of limitation.

EXAMPLE I

1. *Technical 1-(N-lauryl-2-aminoethyl)piperazine*

Technical lauryl chloride (40.8 g., distilling range: 110–160°/5 mm.) was dropped during one hour into 104.0 g. of 1-(2-aminoethyl)piperazine, being agitated and heated to 100–105° C. in a flask fitted with a sealed stirrer, a thermometer, a dropping funnel and a reflux condenser. The whole was then stirred and heated at 120° for an additional 5 hours. Absolute ethanol (150 ml.) and a solution of 8 g. of sodium hydroxide in 10 ml. of water were then added at 80° C. After refluxing for 30 minutes, the contents of the flask were agitated for 3 hours at room temperature.

The precipitated salt was filtered off and the filtrate was freed of the solvent by distillation at slightly reduced pressure. The residue was distilled at a pressure of 3 mm. At 90–150° C., the recovered 1-(2-aminoethyl)piperazine (72.3 g.) distilled over. The fraction, distilling at 150–220° C. was technical 1-(N-lauryl-2-aminoethyl)-piperazine. Yield: 48.3 g. (118.4% by weight, based on lauryl chloride). It is a cloudy, yellow oil, soluble in water and 1% hydrochloric acid. Its solution in 1% sodium hydroxide is very turbid.

*Analysis.*—Calcd. for $C_{18}H_{39}N_3$: C, 72.8%; H, 13.1%; N, 14.1%. Found: C, 72.8%; H, 12.8%; N, 14.4%.

EXAMPLE II

2. *Pure 1-(N-dodecyl-2-aminoethyl)piperazine*

This compound was prepared according to the method of Example I. Pure 1-chlorododecane (40.8 g.) was used instead of technical lauryl chloride. The fraction with a distilling range of 192–198° C. at 3 mm. was pure 1-(N-dodecyl-2-aminoethyl)piperazine. Yield: 33.5 g. (82% by weight, based on chlorododecane). It is a cloudy, yellow oil, soluble in water and 1% hydrochloric acid. Its solution in 1% sodium hydroxide is slightly hazy and viscous. All solutions foam.

*Analysis.*—Calcd. for $C_{18}H_{39}N_3$: C, 72.8%; H, 13.1%; N, 14.1%. Found: C, 72.2%, $n_D^{20}$ 1.4737; H, 12.9%; N, 14.3%.

Additional 14.1 g. of the compound, distilling at 198–215° C. at 3 mm., had the same refractive index.

EXAMPLE III

3. *1-(N-tetradecyl-2-aminoethyl)piperazine*

1-chlorotetradecane (27.8 g.), 1-(2-aminoethyl)-piperazine (52 g.), sodium hydroxide (4 g. in 5 ml. of water) and ethanol (100 ml.) were brought to reaction as described in Example I. The fraction distilling at 155–165° C. at 5 mm. was pure 1-(N-tetradecyl-2-aminoethyl)-piperazine. Yield: 15.9 g. (57.2% by weight, based on 1-chlorotetradecane). It is a cloudy, yellow oil. Its 1% solution in water is viscous and does not foam to a great degree. With 1% hydrochloric acid, it forms a clear, foaming solution. Its dispersion in 1% sodium hydroxide is foaming.

*Analysis.*—Calcd. for $C_{20}H_{43}N_3$; C, 73.9%; H, 13.2%; N, 12.9%. Found: C, 74.0%, $n_D^{20}$ 1.4737; H, 12.9%; N, 13.2%.

The products made in accordance with the foregoing specific examples, when incorporated in water to the extent of 0.01% to 0.1% by weight of the water, were effective in sterilizing milk bottles and disinfecting metallic kitchen utensils.

The foregoing illustrates the invention, which, however, is not to be limited thereby, but is to be construed as broadly as permissible in view of the prior art and limited solely by the appended claims.

I claim:
1. A compound having the formula:

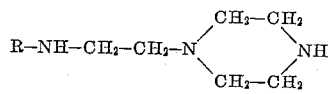

where R is a member selected from the group consisting of dodecyl and tetradecyl; and the hydrochloride of said compound.

2. 1-(N-dodecyl-2-aminoethyl)-piperazine.
3. 1-(N-tetradecyl-2-aminoethyl)-piperazine.

References Cited in the file of this patent

Hromatka et al.: Monatshefte fur Chemie, vol. 82, page 884 (1951).